Jan. 13, 1925.
H. S. BERGEN
1,522,609
PENDULUM
Filed Sept. 26, 1921
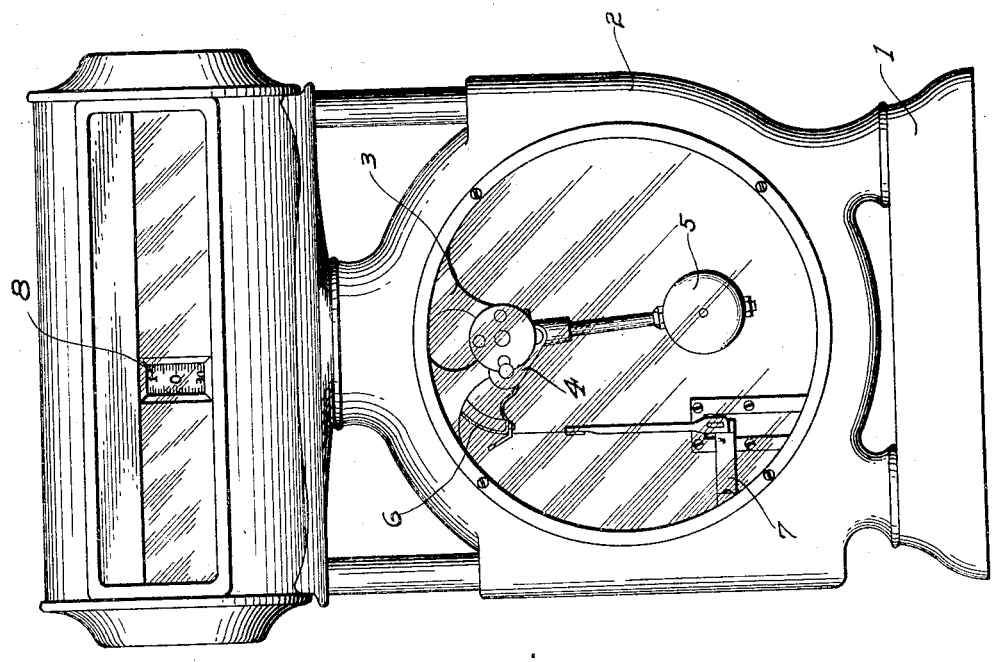
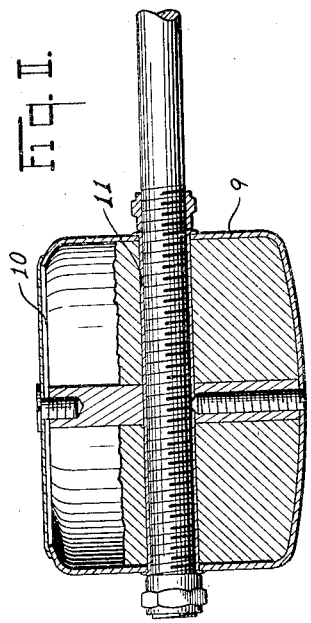
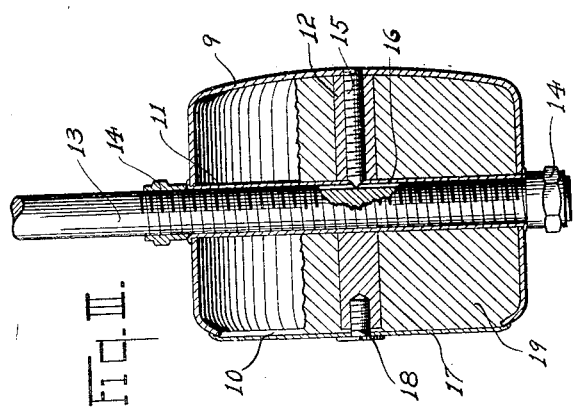
Inventor
HARRY S. BERGEN
By C. D. Marshall
Attorney Patented Jan. 13, 1925.

1,522,609

UNITED STATES PATENT OFFICE.

HARRY S. BERGEN, OF TOLEDO, OHIO, ASSIGNOR TO TOLEDO SCALE COMPANY, OF TOLEDO, OHIO, A CORPORATION OF NEW JERSEY.

PENDULUM.

Application filed September 26, 1921. Serial No. 503,197.

*To all whom it may concern:*

Be it known that I, HARRY S. BERGEN, a citizen of the United States, residing at Toledo, in the county of Lucas and State of Ohio, have invented certain new and useful Improvements in Pendulums, of which the following is a specification.

This invention relates to pendulums, and more particularly to that class of pendulums in which the desired weight is obtained by pouring a quantity of molten metal into a hollow shell.

One object of this invention is to provide a pendulum which may be sealed to any desired weight within certain limits without altering the sizes or arrangement of the parts thereof.

Another object is to provide a pendulum of this type which may be cheaply and easily manufactured.

Another object is to provide a pendulum having a shell adapted to receive molten metal, in which provision is made for the passage of the pendulum stem through the shell after the molten metal has set.

Other objects and advantages will be apparent from the following description, in which reference is had to the accompanying drawings illustrating a preferred embodiment of my invention and wherein similar reference numerals designate similar parts throughout the several views.

In the drawings:—

Figure 1 is a rear elevational view of a scale having a pendulum embodying my invention;

Figure 2 is an enlarged sectional view through a pendulum showing the position to which the shell is turned when the metal is poured and the position taken by the metal immediately after pouring; and Figure 3 is a similar sectional view through a pendulum which has been righted after the metal has been poured but before it has solidified.

By way of example, I have illustrated my invention as applied to the pendulum of a cylinder scale of well-known type, and the invention is particularly adapted for use in the pendulums of scales, but it is to be understood that it may also be applied to other devices, such, for instance, as pendulum clocks and centrifugal governors. The scale will, therefore, be described only in such detail as is necessary to clearly explain the application of my invention thereto. It consists of a base 1 mounted upon which is a substantially watch-casing-shaped housing 2, the upper portion of which has a pair of interiorly depending brackets 3 preferably integral therewith upon which is pivoted the pendulum structure 4, consisting of a weight 5 rigidly connected by means of a stem to a power sector 6, the power sector being in turn connected by means of a ribbon to the nose of the main scale lever. A laterally extending arm 7 rigid with the scale lever is connected to a rack bar (not shown) by which the cylindrical indicator 8 is moved to position to indicate the weight of the load offset by the pendulum.

The pendulum weight 5 consists of a substantially cylindrical cup-like shell 9, one end of which has a circular opening 10 therein. Diametrically positioned in the shell 9 and projecting through the curved walls thereof is a tube or sleeve 11, the projecting ends of which are upset or swaged against the walls of the shell to hold the sleeve 11 rigid with respect thereto. A bar 12 having an opening therein which receives the sleeve 11 is secured in an axial position in the cylindrical shell. The sleeve 11 is adapted to receive a threaded portion of a pendulum stem 13 which is attached to the pendulum shell by means of nuts 14. By loosening the nuts 14 the pendulum shell may be adjusted longitudinally upon the stem 13 to increase or decrease the value of the moment arm of the pendulum as desired.

One end of the bar 12 is provided with a threaded aperture which registers with an opening of the same diameter in the wall of the pendulum shell. A threaded headless set screw 15 passes through the opening in the wall of the shell and is threaded into the opening in the bar 12. The pendulum 13 has a groove 16 milled therein to receive the conical end of the set screw 15.

The set screw 15 serves a three-fold purpose—it prevents rotation of the shell on the stem when the nuts 14, as well as the set screw itself, are loosened and the shell is being moved upwardly or downwardly; it locks the stem and shell in adjusted position when it is tightened up; and it also assists in holding the bar 12 in place in the shell before the metal 19 is introduced into the shell.

The opening 10 in the end of the shell is closed by a circular cover or obturator 17. The end of the bar 12 has a threaded opening therein to receive a screw 18 adapted to hold the cover 17 tightly in place on the shell 9.

In filling the pendulum shell, the shell is placed upon the platform of a scale with the screw 18 and cover 17 removed and the end of the shell having the opening 10 uppermost. The cover 17 and screw 18 may, if desired, also be placed upon the scale platform so that their weight will be included in the total weight of the shell and contents after the required amount of filling has been introduced into the shell. The shell is brought to the required weight by partially filling it with a heavy metal, preferably one having a low melting point, such as lead, which is poured into the opening 10 until the shell and contents are brought to the proper weight. After pouring, the metal may be allowed to solidify in the position shown in Figure 2 or the cover 17 may be immediately placed upon the shell and fastened in place by the screw 18 and the shell turned while the lead or other filling metal is still in a molten state to the position shown in Figure 3. The molten metal will then assume its permanent form in the position shown in Figure 3. In either case the filling metal when set serves not only to give the pendulum weight, but to permanently fix the positions of the shell and the parts located therein.

The use of pendulums constructed as above described makes possible any desired variation in the weights of the pendulums, while at the same time it is possible to employ standard parts for all variations. The pendulum shells may be stamped out of sheet metal, and present a uniformly pleasing appearance.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a device of the class described, a pendulum weight comprising, in combination, a shell having an opening therein, a tube passing through said shell and adapted to receive the pendulum stem, a supporting member within said shell, a cover for said opening, and means for securing said cover to said supporting member.

2. In a device of the class described, a pendulum weight comprising, in combination, a shell having an opening therein, a cover for said opening, a supporting member within said shell and extending adjacent the center of said opening, and means for securing said cover to said supporting member.

3. In a device of the class described, a pendulum weight comprising, in combination, a shell having an opening therein, a bar having one end secured to said shell and its free end extending into juxtaposition to said opening, a cover for said opening, and means for securing said cover to the free end of said bar.

4. In a device of the class described, a pendulum weight comprising, in combination, a shell having an opening therein, a bar positioned within said shell, a tube passing through said shell and said bar, and a filling metal within said shell.

5. In a device of the class described, in combination, a shell, a bar within said shell, a tube passing through said shell, said shell, bar and tube having registering openings, a pendulum stem within said tube, said pendulum stem having a groove therein, and a set screw passing through the opening in said shell, bar and tube and extending into the groove of said pendulum stem.

6. In a device of the class described, in combination, a shell having an opening therein, a bar therein, a tube passing through said shell and bar, a stem received within said tube, a set screw passing through said shell, bar and tube and engageable with said stem, a cover for said opening, and means for securing said cover to said bar.

7. In a device of the class described, in combination, a shell having an opening therein, a bar within said shell, a tube passing through said shell and bar, a threaded stem within said tube, adjusting nuts engaging said stem at the ends of said tube, a set screw threaded into said bar and engageable with said stem, a cover for the opening in said shell, and a screw passing through said cover and threaded into said bar.

8. In a device of the class described, in combination, a shell, a bar therein, a tube passing through said bar and shell, a threaded pendulum stem received in said tube and having a longitudinal groove in one side thereof, a set screw threaded into said bar and extending into the groove in said stem, a cover for the opening in said shell, and means for attaching said cover to said bar.

HARRY S. BERGEN.

Witnesses:
W. R. EMIG,
C. H. BLAYZ.